US 11,488,472 B2

(12) United States Patent
Parenti et al.

(10) Patent No.: US 11,488,472 B2
(45) Date of Patent: Nov. 1, 2022

(54) VEHICLE SOUND EMISSION CONTROL

(71) Applicant: Ford Global Technologies, LLC, Dearborn, MI (US)

(72) Inventors: Robert Parenti, Dearborn, MI (US); Brad Alan Ignaczak, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 17/071,032

(22) Filed: Oct. 15, 2020

(65) Prior Publication Data

US 2022/0122453 A1   Apr. 21, 2022

(51) Int. Cl.
  *G08G 1/052*  (2006.01)
  *B60W 60/00*  (2020.01)
  *G08G 1/01*   (2006.01)

(52) U.S. Cl.
  CPC ........... *G08G 1/052* (2013.01); *B60W 60/001* (2020.02); *G08G 1/0125* (2013.01); *B60W 2420/60* (2013.01); *B60W 2554/4049* (2020.02)

(58) Field of Classification Search
  CPC ... G08G 1/052; G08G 1/0125; B60W 60/001; B60W 2554/4049; B60W 2420/60; H04R 3/05; H04R 3/04; B60Q 5/005; G08B 3/10
  See application file for complete search history.

(56) References Cited

U.S. PATENT DOCUMENTS

| | | | | |
|---|---|---|---|---|
| 5,012,221 | A * | 4/1991 | Neuhaus | G08B 3/10 340/474 |
| 10,547,941 | B1 * | 1/2020 | Herman | B60Q 5/005 |
| 2009/0176457 | A1 | 7/2009 | Christensen et al. | |
| 2010/0231368 | A1 * | 9/2010 | Nakayama | B60Q 5/00 340/425.5 |
| 2010/0245581 | A1 | 9/2010 | Koyama et al. | |
| 2011/0032087 | A1 * | 2/2011 | Nakayama | B60Q 5/008 340/384.1 |
| 2011/0032122 | A1 * | 2/2011 | Hayashi | G08G 1/04 340/943 |
| 2012/0320212 | A1 * | 12/2012 | Aimura | G01C 21/3602 348/148 |
| 2013/0076504 | A1 * | 3/2013 | Nakayama | G10K 15/02 340/463 |
| 2018/0015878 | A1 * | 1/2018 | McNew | B60Q 9/008 |
| 2020/0100028 | A1 * | 3/2020 | Hashimoto | G08G 1/16 |

* cited by examiner

*Primary Examiner* — Peter D Nolan
*Assistant Examiner* — Kenneth M Dunne
(74) *Attorney, Agent, or Firm* — Frank Lollo; Bejin Bieneman PLC

(57) ABSTRACT

A speed of a target vehicle can be detected. A difference in host vehicle speed and the speed of the target vehicle is determined. A target frequency is specified for a sound to be received at the target vehicle. A sending frequency is determined for the sound based on the target frequency and the difference in host vehicle speed and target vehicle speed. The sound is transmitted at the sending frequency.

18 Claims, 4 Drawing Sheets

VEHICLE SOUND EMISSION CONTROL

BACKGROUND

The Doppler effect describes the phenomenon whereby a wave emitted from a source at a given frequency will be received by an observer at a different frequency if the observer is moving relative to the source. Light and sound waves can experience the Doppler effect.

Anyone who has listened to the siren of a moving vehicle such as a train blowing a horn or an emergency vehicle sounding a siren has experienced the Doppler effect. The sound of a vehicle moving toward you will have a higher pitch than it would have if you and the vehicle were stationary with respect to each other. The sound of a vehicle moving away from you will have a lower pitch than it would have if you and the vehicle were stationary with respect to each other. This is because sound waves from a vehicle moving toward an observer are compressed, and sound waves from a vehicle moving away from an observer are expanded. Thus, the Doppler effect can result in a sound such as a siren emitted from a vehicles being perceived at different pitches or tones than would be perceived were the vehicle and an observer (i.e., perceiver) of the sound stationary with respect to each other. However, sounds perceived at certain pitches may not be effective, e.g., can be difficult to hear and/or may not provide an intended warning.

DETAILED DESCRIPTION

Figure 1:
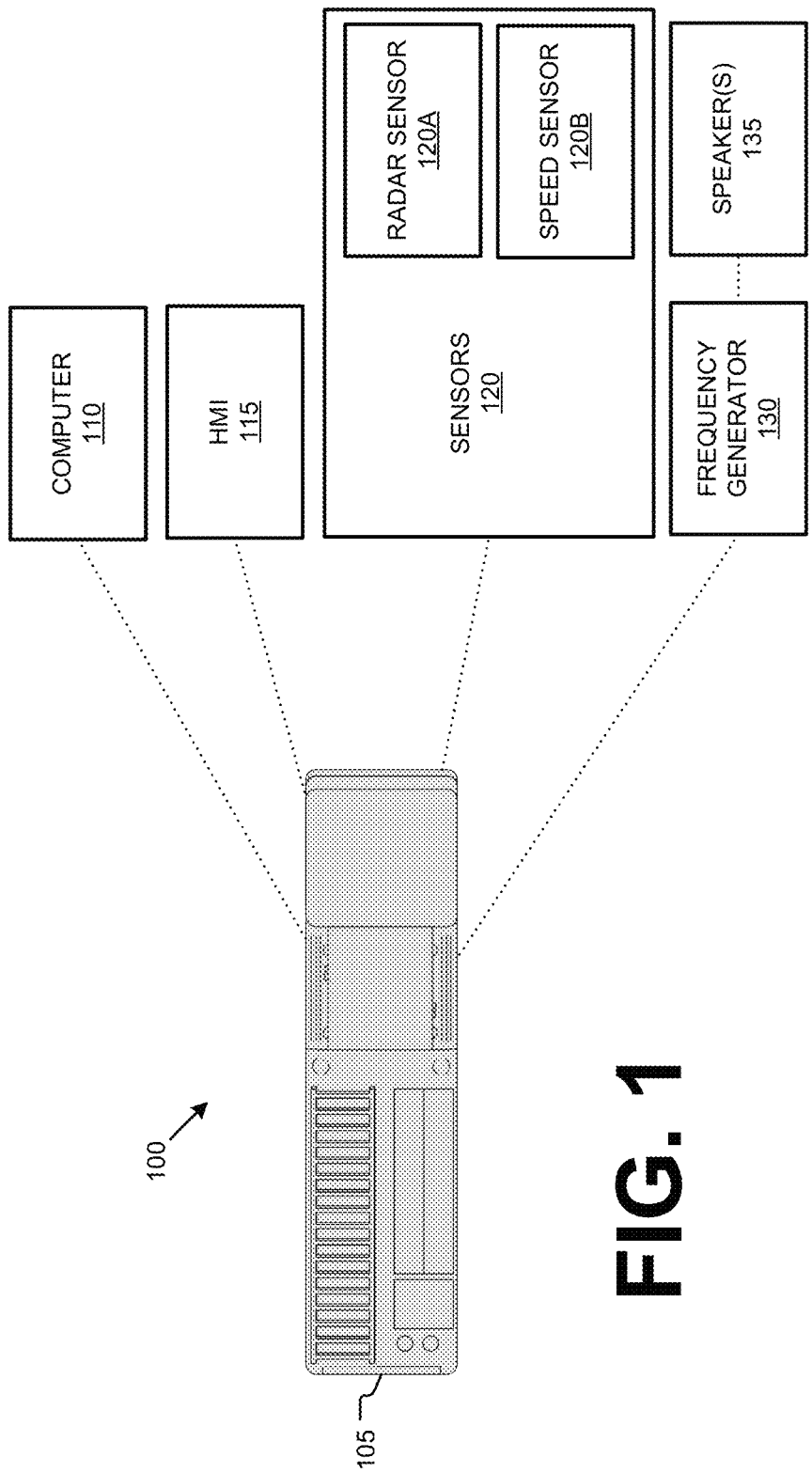
FIG. 1 is a diagram of an exemplary system for controlling sound emitted from a vehicle.
Figure 2:
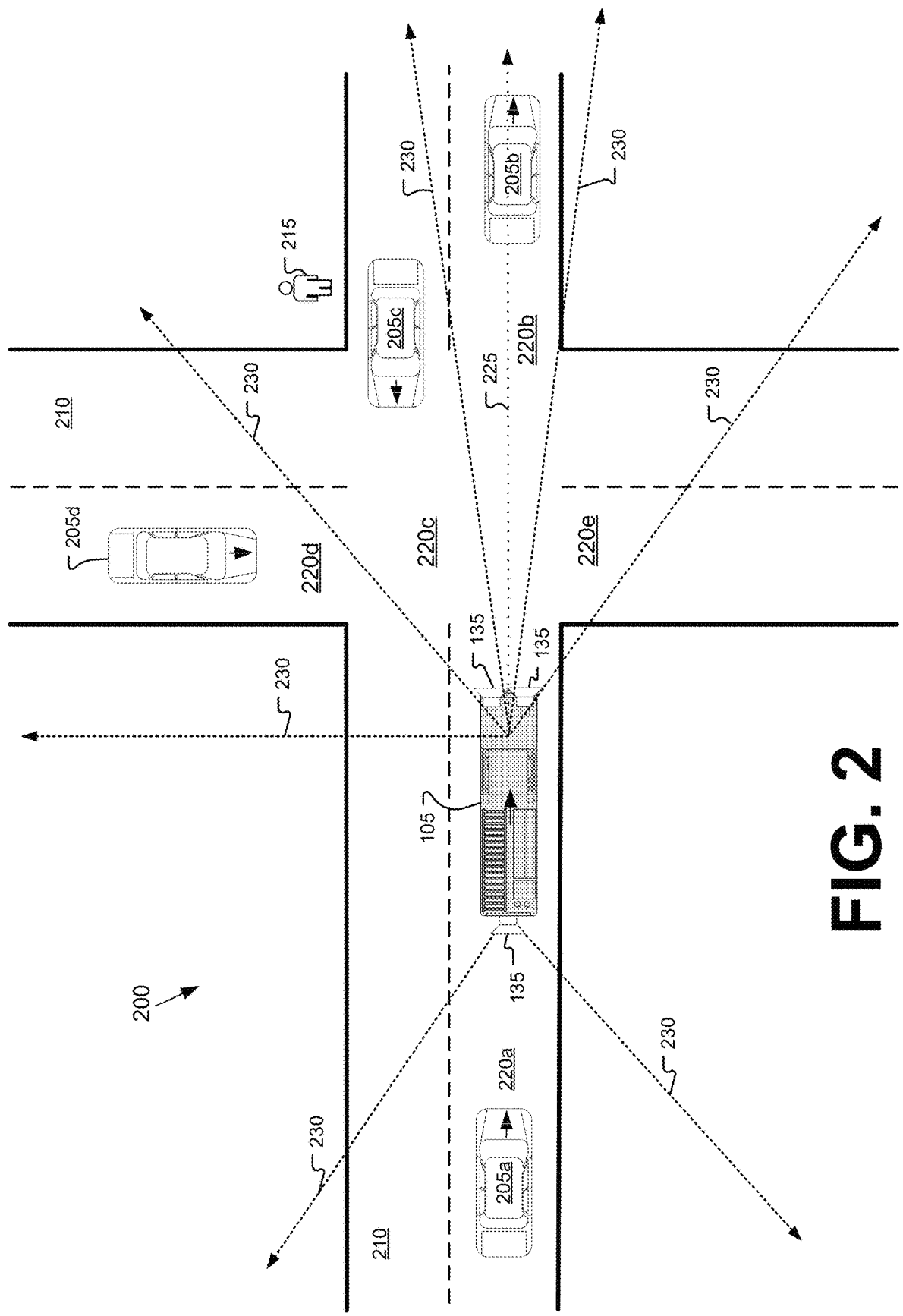
FIG. 2 is a diagram of an exemplary traffic scene.

Referring to FIGS. 1 and 2, described herein is a system 100 wherein a host vehicle 105 can adjust emitted sounds such as sirens to compensate for the Doppler effect, i.e., to optimize emitted sounds for recipients. The host vehicle 105 includes sensors 120 that can provide data from which the host vehicle 105 can detect one or more targets, i.e., object to receive sound from the host vehicle 105, such as one or more target vehicles 205 (i.e., vehicles other than the host vehicle 105) or pedestrians 215. Further, in addition to detecting its own speed, the host vehicle 105 can detect speeds of identified target vehicles 205. The host vehicle 105 can determine its speed relative to a target vehicle 205, and, to compensate for the Doppler effect, can adjust a frequency at which sound is emitted from the host vehicle 105, e.g., by a siren, so that that sound will be received at the target vehicle 205 at a frequency whereby the sound will be heard at a desired, and possibly unchanging, but possibly varying within a specified range, pitch, rather than at a pitch than changes and/or is higher or lower than a pitch or range of pitches at which the host vehicle 105 emitted sound is desired to be heard.

Referring now to FIG. 1, the system 100 in a host vehicle 105 includes the host vehicle 105 and elements as described herein to control and adjust emission of sounds from vehicle 105 speakers 135. The vehicle 105 is referred to as a "host" vehicle for convenience, i.e., to denote that the host vehicle 105 is a vehicle 105 emitting and adjusting sound as disclosed herein. The host vehicle 105 and target vehicles 205 (FIG. 2) may be any suitable type of motorcycle, truck, van, etc. The vehicle 105, for example, may be an autonomous or semi-autonomous vehicle 105. In other words, the vehicle 105 may be autonomously operated such that the vehicle 105 may be driven without constant attention from a driver, i.e., the vehicle 105 may be partly or entirely self-driving without human input. Further, although the vehicles discussed herein are land vehicles, it will be understood that presently disclosed and claimed principles could be applicable to waterborne and/or airborne vehicles.

The host vehicle 105 includes a computer 110 that includes a processor and a memory such as are known. The memory includes one or more forms of computer 110 readable media, and stores instructions executable by the vehicle 105 computer 110 for performing various operations, including as disclosed herein. The computer 110 may include programming to operate one or more of vehicle 105 brakes, propulsion (e.g., control of acceleration in the vehicle 105 by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 network such as a communications bus as described further below, more than one processor, e.g., included in components such as sensors 120, electronic controller units (ECUs) or the like included in the vehicle 105 for monitoring and/or controlling various vehicle 105 components, e.g., a powertrain controller, a brake controller, a steering controller, etc. The computer 110 is generally arranged for communications on a vehicle 105 communication network that can include a bus in the vehicle 105 such as a controller area network (CAN) or the like, and/or other wired and/or wireless mechanisms. Via the vehicle 105 network, the computer 110 may transmit messages to various devices in the vehicle 105 and/or receive messages (e.g., CAN messages) from the various devices, e.g., sensors 120, an actuator, an HMI 115), etc. Alternatively or additionally, in cases where the computer 110 actually comprises a plurality of devices, the vehicle 105 communication network may be used for communications between devices represented as the computer 110 in this disclosure. Further, various controllers and/or sensors 120, including as described further below, may provide data to the computer 110 via the vehicle 105 communication network.

The vehicle 105 can include an HMI 115 (human-machine interface), e.g., one or more of a display, a touchscreen display, a microphone, a speaker 135, etc. The user can provide input to devices such as the computer 110 via the HMI 115. The HMI 115 can communicate with the computer 110 via the vehicle 105 network, e.g., the HMI 115 can send a message including the user input provided via a touchscreen, microphone, a camera that captures a gesture, etc., to the computer 110, and/or can display output, e.g., via a screen, speaker 135, etc.

The host vehicle 105 can include various sensors 120. A sensor 120 is a device that can obtain one or more measurements of one or more physical phenomena. Often, but not necessarily, a sensor 120 includes a digital-to-analog converter to converted sensed analog data to a digital signal that can be provided to a digital computer 110, e.g., via a network. sensors 120 can include a variety of devices, and can be disposed to sense and environment, provide data about a machine, etc., in a variety of ways. For example, conventional sensors in the vehicle 105 can include one or more radar sensors 120A, a vehicle speed sensor 120B, as well as other sensors to provide data about a location, speed, environment, etc., of the vehicle 105, such as ultrasonic transducers, weight sensors, accelerometers, motion detectors, etc., i.e., sensors 120 to provide a variety of data, etc. Moreover, various controllers in a vehicle 105 may operate as sensors 120 to provide data via the vehicle 105 network or bus, e.g., data relating to vehicle 105 speed, acceleration, location, subsystem and/or component status, etc. To provide just a few non-limiting examples, sensor 120 data could include data for determining a presence and/or location of an object around a vehicle 105, a speed of an object, a type of an object (e.g., vehicle, person, rock, etc.), a slope of a roadway, a temperature, an presence or amount of moisture in an ambient environment, etc.

The computer 110 can determine or detect a speed of a target vehicle 205 via data from various sensors 120, e.g., as described herein, a radar sensor 120A is used in some examples. A radar sensor 120A as is known uses radio waves to determine the relative location, angle, and/or velocity of an object. Further, the computer 110 could identify as a target vehicle 205 an object detected by sensors 120, e.g., a radar sensor 120A, as moving not only with respect to the vehicle 105, but with respect to a ground surface. Yet further, the computer 110 could identify a target vehicle 205 or other target such as a pedestrian 115, and/or determine a speed or speeds thereof, by techniques for interpreting sensor 120 data such as lidar data, video or still camera image data, upon which a suitable object recognition technique, for example, could be performed to identify the target 205, 215, etc.

The host vehicle 105 computer 110 can detect a speed of the host vehicle 105 via data from a host vehicle speed sensor 120B. A vehicle speed sensor 120B outputs a vehicle 105 speed, i.e., a rate of movement of the vehicle 105, typically in a forward direction, with respect to a ground surface such as a road 210. For example, one or more wheel speed sensors 120 can be provided as is known to detect a rate of rotation of vehicle 105 wheels, from which a speed of the vehicle 105 can be determined. Alternatively or additionally, a vehicle speed sensor 120B can detect a rate of rotation of a crankshaft, from which the vehicle 105 speed can be determined.

As further discussed below, the host vehicle 105 computer 110 can determine a difference in the host vehicle 105 speed and the speed of the target vehicle 205. For example, a speed of a target such as a target vehicle 205 can be determined via data from a radar sensor 120A. A vehicle 105 speed can be determined from a speed sensor 120B in the vehicle 105. A simple subtraction operation can then be performed to determine a difference between these two speeds as discussed further below.

The host vehicle 105 computer 110 can specify a target frequency for a sound to be emitted from speaker(s) 135 based at least in part on a location of the target vehicle 205 relative to the host vehicle 105. For example, as discussed further below, and referring also to FIG. 2, the computer 110 can select one or more zones 220 wherein a location of a target such as a target vehicle 205 or pedestrian 215 is within a zone 220, to receive sound at a target frequency or frequencies.

Sound at the target frequency can be provided, i.e., emitted, by utilizing a frequency generator 130 coupled to a speaker 135. The computer 110 can be programmed to actuate a first speaker 135 to transmit a first sound at the first sending frequency and a second speaker 135 to transmit a second sound at the second sending frequency. The computer 110 can be further programmed to actuate a speaker 135 at a first time to transmit the first sound at the first sending frequency and to actuate the speaker 135 at a second time to transmit the second sound at a second sending frequency.

A frequency generator 130 includes programming and hardware to generate a wave, typically a sine wave or the like, at a specified frequency. The frequency generator 130 can vary the specified frequency of the output wave over time, e.g., in a range between a specified lower boundary frequency and an upper boundary frequency, e.g., in the case of a sound wave, to create a siren effect. For example, a computer 110 could be programmed to output a digital waveform at the specified frequency, the frequency generator 130 further including a digital-to-analog converter to convert the digital waveform into an analog signal to be input to a conventional amplifier (not shown) that can be included in a speaker 135 or otherwise in the system 100. The host vehicle 105 computer 110 can further be programmed to specify a range of frequencies from a first frequency to a second frequency, and to transmit the sound within the range of frequencies.

A loudspeaker, or speaker 135, is a device that, as is known, can convert an electrical signal to sound, i.e., a speaker 135 can include a transducer that converts the electric signal to vibrations to generate sound at a desired frequency. A speaker 135 can receive the electrical signal from an audio amplifier.

As noted above, the host vehicle 105 computer 110 can detect more than one target, including more than one vehicle 205. The host vehicle 105 computer 110 can determine at least one second sending frequency for at least one second sound, and can then transmit a second sound or sounds at a specified volume and/or in a specified zone 220 (see FIG. 2) to be perceived by a detected target such as a target vehicle 205 or pedestrian 215. The host vehicle 105 computer 110 can further be programmed to specify the frequency for the sound based at least in part on a path and/or or location of the target vehicle 205. A specified volume for a sound can depend at least in part on a determined distance of a target from the host vehicle 105.

FIG. 2 illustrates a traffic scene 200. A traffic scene 200 includes one or more roads 210 and can further include one or more targets (i.e., objects identified by the computer 110 to receive sound from the vehicle 105) host vehicles and/or target vehicles 205 at any given time. A target vehicle 205 is a vehicle 105 such as described above for the host vehicle 105 but referred to separately for convenience in the present description. A road 210 herein, unless specified otherwise, means any ground surface designated for travel of a vehicle 105. Typically, a road 210 includes a prepared travel surface, e.g., graded dirt, asphalt, gravel, etc. Further, a road 210 typically includes markings, e.g., paint, embedded markers, etc., to guide vehicle 105 travel, e.g., in one or more lanes. A road 210 can include more than one lane for vehicle 105 travel; each lane can be designated for travel in a specified direction. In some examples, and as illustrated in FIG. 2, a first road 210 can cross or merge with a second road 210, thereby forming an intersection.

As illustrated in FIG. 2, the host vehicle 105 is moving in a forward direction (indicated by the arrow on the vehicle 105). Further, one or more second vehicles 205 (referred to for convenience as "target" vehicles 205) such as the illustrated target vehicles 205a, 205b, 205c, 205d, may be present in the traffic scene 200, e.g., traveling on a road 210. Further, other objects, such as a pedestrian 215 standing at an edge of, perhaps waiting to cross, a road 210, could be present. Each of the target vehicles 205 and/or a pedestrian 215 and/or other objects could be stationary or moving. For example, as illustrated, the pedestrian 215 is stationary, i.e., standing in substantially a same location over time, and the target vehicles 205 are each moving in a direction indicated by the respective arrows on each of the illustrated target vehicles 205.

For present purposes, assume that the host vehicle 105 is moving away from the target vehicle 205a, i.e., the target vehicle 205a is either stationary or moving in a same direction but at a slower rate of speed than the host vehicle 105. Assume that the host vehicle 105 is moving toward the target vehicle 205b, i.e., the target vehicle 205b is stationary or moving in the same direction but at a slower rate of speed and the host vehicle 105. As illustrated, the target vehicle 205c is moving in an opposite direction then, i.e., by convention we say has a negative speed with respect to, the host vehicle 105. Further, the target vehicle 205d is moving in a direction perpendicular to that of the host vehicle 105. Yet further, the traffic scene 200 includes a stationary pedestrian 220.

Thus, as the host vehicle 105 moves, an observer in each of the vehicles 205, and the pedestrian 220, will experience sound emitted from a speaker 135 on the vehicle 105 according to the Doppler effect. The Doppler effect is described by Equation 1 below, in which f is observed frequency of a wave (i.e., in present examples a sound wave) emitted at a frequency $f_0$, c is a speed of the wave, $\Delta v$ is a difference in speeds of a wave source and wave receiver given by $\Delta v = -(v_r - v_s)$, i.e., the negative of the difference between a velocity of a wave receiver minus a velocity of a wave source.

$$f = \left(1 + \frac{\Delta v}{c}\right) f_0 \qquad \text{(Eq. 1)}$$

Note that the speed difference $\Delta v$ in this simple case could be directly measured using a radar sensor 120A in the host vehicle 105 to measure relative speed between the source and receiver. Further, it is to be understood that implementations are possible in which the source and receiver objects are traveling with headings that are at a non-zero angle (or not at a one-hundred-eighty degree angle) relative to each other. That is, techniques for determining the Doppler effect where relative velocities are radial or angular are known. In such examples $\Delta v$ can represent the relative velocity between the objects with headings that are at angles with respect to each other. The source velocity $v_s$ may be determined using a host vehicle speed sensor, and the receiver velocity $v_r$ may be determined using one or more sensors such as radar, camera, lidar, etc.

Then, if $f_r$ is a frequency of a sound wave desired to be observed, i.e., received and perceived, at a target vehicle 205, c is a speed of sound, e.g., about 343 meters per second (m/s) in air at 20° C. at sea level), and $\Delta v$ gives a difference in velocity between the host vehicle 105 and a selected target vehicle 205, then Equation 2 can be used to determine a frequency $f_t$ at which a sound such as a siren sound should be emitted to be received by the selected target vehicle 205.

Note that, in Equation 2, $\Delta v = (v_r - v_s)$, i.e., the difference (rather than the negative of the difference) between a velocity of a wave receiver minus a velocity of a wave source (or transmitter).

$$f_t = \left(1 + \frac{\Delta v}{c}\right) f_r \qquad \text{(Eq. 2)}$$

Using Equation 2, a computer 110 can, given a frequency of sound to be provided to a receiver, determine a transmission, i.e., emission, frequency. For example, assume that it is desired that a siren sound be received (e.g., for perception, i.e., hearing, by someone in a target vehicle 205) at a frequency of 800 hertz (Hz). Then, setting $f_r$ to 800 Hz, and assuming that a host vehicle 105 is traveling at 30 m/s and a target vehicle 205 is determined to be traveling at 20 m/s, so $\Delta v = -10$ m/s, then according to Equation 2:

$$f_t = \left(1 + \frac{\Delta v}{c}\right) f_r = \left(1 + \frac{-10 \text{ m/s}}{343 \text{ m/s}}\right) 800 \text{ Hz} = 776.7 \text{ Hz}.$$

Further, because sirens and the like often transmit over a range of frequencies over time, i.e., moving from a lower frequency to a higher frequency and back again in repetition, Equation 2 could be used to determine upper and lower bounds for a range of frequencies for transmission of a sound such as a siren via speakers 135. For example, 800 Hz could be specified for a low end of a frequency range, and 1000 Hz could be selected for a high-end of a frequency range. In that case, assuming vehicle 105, 205 speeds are determined by the computer 110 to be 30 m/s and 20 m/s, respectively, then Equation 2 could be used to determine a lower transmission frequency bound of 776.7 Hz, and an upper transmission frequency bound of 970.8 Hz.

Yet further alternatively or additionally, the computer 110 could be programmed to transmit sound at different frequencies based on a location of a target, e.g., depending on a presence of target vehicles 205 in respective areas or zones 220a, 220, 220c, 220d, 220e (collectively referred to as zones 220) around the host vehicle 105. For example, the computer 110 could be programmed to define a first zone 220a to a rear of the vehicle 105. Further, the computer 110 could be programmed to define various zones 220 around the vehicle 105. For example, zones 220 can be defined with respect to an axis defined with respect to the vehicle 105, such as the longitudinal axis 225, and lines 230 at a specified angle to the axis 225 or to each other.

Note that FIG. 2 is intended to be illustrative but not limiting; one zone 220a is shown to the rear of the host vehicle 105, and zones 220b-220e are shown alongside and/or forward of the host vehicle 105, but that any suitable number of zones 220 could be defined (or omitted) to the rear or forward of the vehicle 105, or, although not shown at all in FIG. 2, two sides of the vehicle 105. Further, angles of lines 230 to the axis 225 can be defined to so that a target located in a zone 220 thus defined can have a specified location with respect to the vehicle 105, e.g., forward (as with the vehicle 205b in the zone 220b) or to the rear (as with the vehicle 205a in the zone 220a).

Yet further, in the present illustration, zones 220 are substantially triangular, i.e., having sides defined by lines 230 and a side furthest from the vehicle 105 (not shown) defined by a range of sensors 120, e.g., radar sensors 120A. However, a zone 220 could have some other shape, e.g., rectangles defined directly and/or indirectly behind and forward of the vehicle 105, etc. In general, zones 220 are defined so that targets located in a zone 220 can be provided with sound at a frequency determined at least in part for a location within the zone 220.

Continuing with the example of FIG. 2, the computer 110 could be programmed to select respective sound transmission frequencies for respective zones 220 so that a received frequency of sound at a target object in a zone 220 will be a desired frequency accounting for the Doppler effect. For example, assume that a desired perceived frequency of sound is 900 Hz. Further assume that a host vehicle 105 is traveling at a speed of 30 m/s, a vehicle 205a in a zone 220a is traveling at a speed or velocity of 25 m/s, a vehicle 205b in a zone 220b is traveling at a speed of 20 m/s, and a vehicle 205c is traveling at a speed of −20 m/s (i.e., is traveling at a speed of 20 m/s in an opposite direction of a direction of travel of the host vehicle 105). In this example, implementing Equation 2, the computer 110 could select respective transmission frequencies of 913.2 Hz for the zone 220a, 873.8 Hz for the zone 220b, and 1031 Hz for the zone 220c.

Yet further additionally or alternatively, the computer 110 could be programmed to select a volume, i.e., amplitude of a sound wave, or sound transmitted within a specified zone 220. For example, a louder volume (e.g., 100 decibels) could be selected for a forward zone 220b, and a less loud volume (e.g., 75 decibels) could be selected for a rear zone 220a. Yet further, the computer 110 could be programmed to select a volume and/or a frequency of sound based on a distance of a target from the vehicle 105 and/or according to a specified zone 220 and/or according to a type of target. For example, the computer 110 could be programmed to increase a volume of sound, e.g., from 75 decibels to 100 decibels, upon detecting a target within a specified distance, e.g., 25 meters, of the host vehicle 105, possibly also upon detecting that the target is stopped or moving more than a specified speed difference from the host vehicle 105, each, more than 50 percent slower. Yet further additionally or alternatively, the computer 110 could be programmed to increase a volume of sound, e.g., from 50 decibels to 100 decibels, at least in part based on a type of target, e.g., based on a pedestrian 215 in a forward zone 220b, 220c, 22e.

FIG. 2 further illustrates a target vehicle 205d in a zone 220d. The target vehicle 205d is traveling in a direction substantially perpendicular to a direction of travel of the host vehicle 105.

Figure 3:
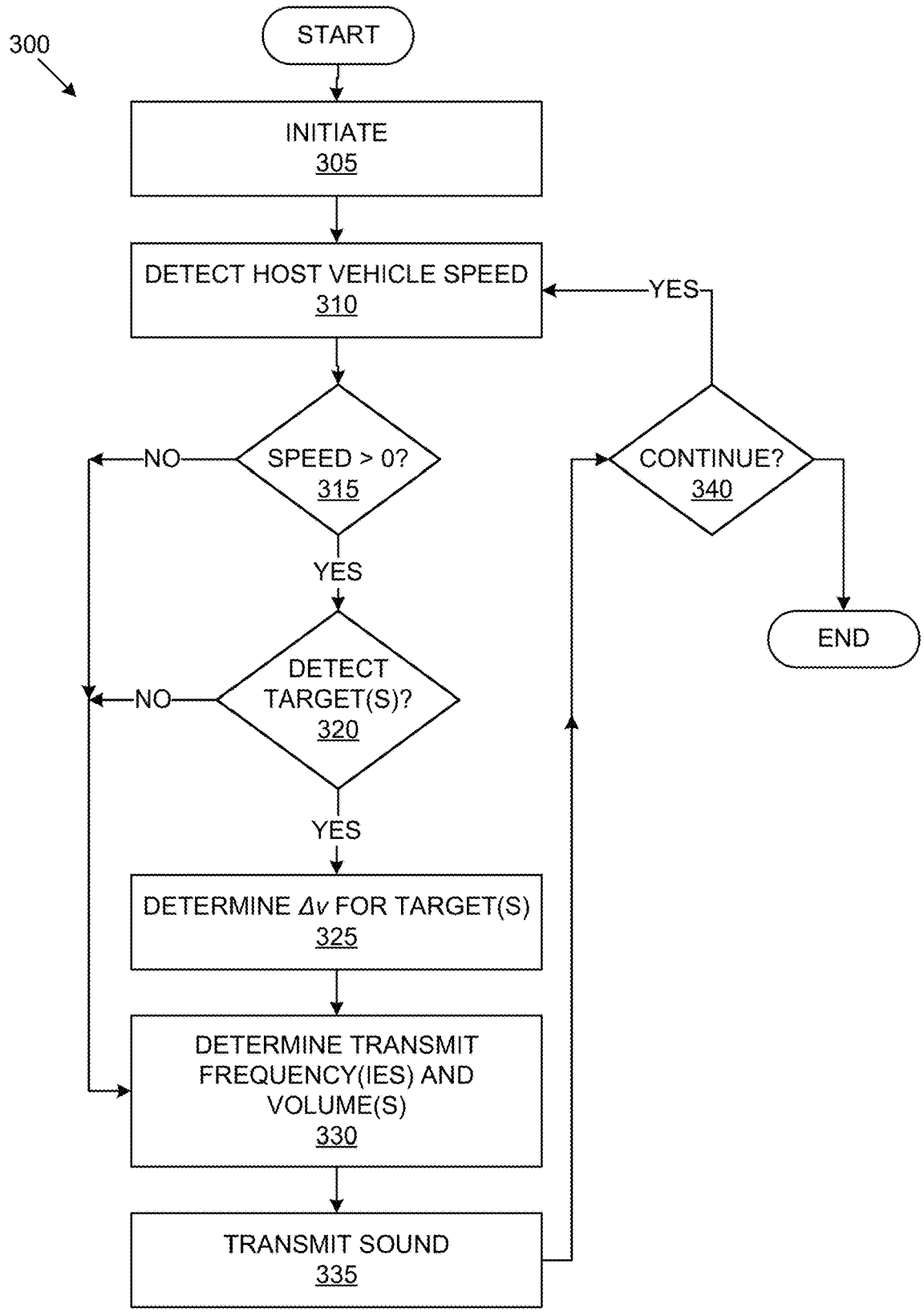
FIG. 3 is a flow diagram of an exemplary process for controlling sound emitted from a vehicle.

FIG. 3 is a flow diagram of an exemplary process 300 for controlling sound emitted from a vehicle 105. The process 300 begins in a block 305, in which the computer 110 in the vehicle 105 receives input to emit a sound, e.g., a siren. For example, input can be provided via an HMI 115, e.g., by selecting a button or virtual button, etc. Typically the computer 110 will store a frequency or range of frequencies of sound desired to be received by an observer, e.g., a frequency or frequency conventionally used for an emergency vehicle siren. However, a user could alternatively or additionally provide input specifying a frequency or range of frequencies of sound desired to be received by an observer, e.g., overriding a default value or values stored by the computer 110.

Next, in a block 310, the computer 110 can determine a speed of the host vehicle 105, e.g., via a speed sensor 120B such as discussed above.

Next, in a block 315, the computer 110 can determine whether the host vehicle 105 speed is substantially greater than zero (e.g., five kilometers per hour or more), i.e., whether the host vehicle 105 is moving in a forward direction. The block 315 could be omitted, but is typically it is useful to adjust a frequency of emitted sound(s) from speakers 135 only if the vehicle 105 is in motion. If the vehicle 105 is moving forward, then a block 320 is executed next. If not, a block 330 is executed next.

In the block 320, the computer 110, e.g., using various techniques for interpreting data from sensors 120, e.g., data from a radar sensor 120A, determines whether one or more targets, e.g., target vehicles 205 and/or pedestrians 215, are present within a range of applicable sensors 120. For example, one or more radar sensors 120A, cameras, lidar, etc., could be used to detect a presence of target vehicles 205. If one or more targets are detected, then a block 325 is executed next. Otherwise, the process 300 proceeds to the block 330.

In the block 325, the computer 110 determines a value $\Delta v$ as discussed above for each of the one or more detected target vehicles 205 and/or other targets, such as one or more pedestrians 215. That is, the computer 110 determine a difference between a host vehicle 105 speed, e.g., as detected by a vehicle 105 speed sensor 120B, and a respective target, e.g., target vehicle 205 speed, e.g., as detected by a radar sensor 120A, to determine the value $\Delta v$ for that target vehicle 205.

Next, in a block 330, the computer 110 determines one or more respective sound transmission frequencies, and possibly also specifies a volume, for emitting a sound or sounds from speaker(s) 135, and/or a time or times for emitting a sound or sounds at a specified frequency or frequencies (see the transmission pattern discussed further below with respect to FIG. 4). When the block 330 is reached following one of the blocks 315, 320, the computer 110 typically is programmed to select a default value or values, e.g., a specified frequency or range of frequencies predetermined for situations where the vehicle 105 is not moving and/or where no target is present, then proceed to a block 335. However, if the vehicle 105 is moving and one or more targets have been identified, then the computer 110 can implement Equation 2 to determine a transmission frequency based on a relative velocity of a target vehicle 205, and/or could determine a range of frequencies based on a relative velocity of a target vehicle 205, and moreover could determine respective transmission frequencies or ranges of transmission frequencies for respective target vehicles 205. A process 400 that could be executed within the block 330 to determine a frequency or frequencies, and to specify zones 220 for respective frequencies to be transmitted, as described further below with respect to FIG. 4.

Following the block 330, in a block 335, the computer 110 actuates the frequency generator 130 and speaker 135 to emit the sound as specified in the block 330, e.g., according to a transmission pattern as discussed below with respect to the process 400.

Next, in the block 340, the computer 110 determines whether the process 300 is to continue. For example, input could be received at the HMI 115 to terminate the emission of sound from the vehicle 105. If the process 300 is to continue, the computer 110 next executes the block 310. Otherwise, the process 300 ends.

Figure 4:
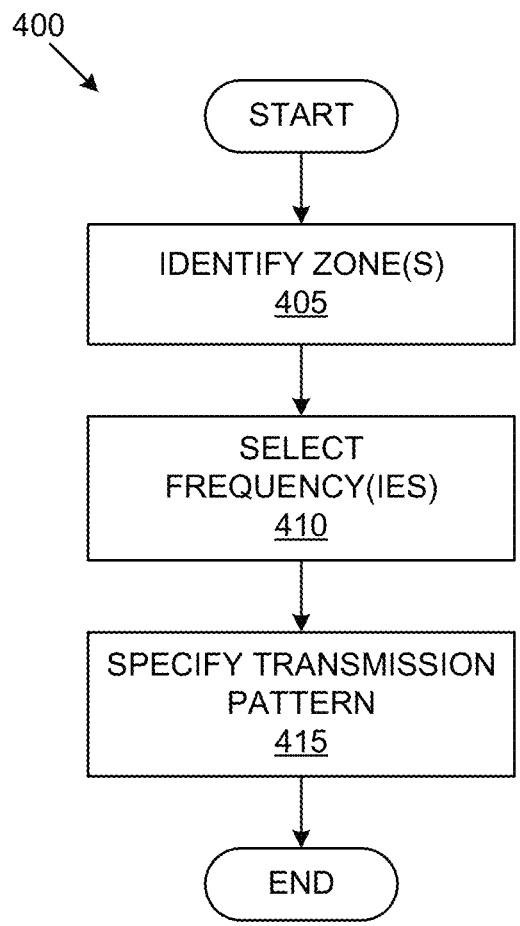
FIG. 4 illustrates an exemplary process to determine a frequency or frequencies, and to specify zones for respective frequencies to be transmitted, from a host vehicle.

FIG. 4 illustrates an example process 400 to determine a frequency or frequencies, and to specify zones 220 for respective frequencies to be transmitted, from a host vehicle 105.

The process 400 begins in a block 405, in which the computer 110 identifies one or more zones 220 occupied by a target such as a target vehicle 205 or pedestrian 215. Zones 220 could be predetermined and stored in a memory of the computer 110, e.g., defined by lines 230 at a specified angle or angles to an axis 225 of the vehicle 105. The computer 110 could then identify zero, one, or more targets in respective zones 220, i.e., by interpreting data from one or more sensors 120 indicating a target or targets, or lack thereof, in a zone 220.

Next, in a block 410, the computer 110 selects a transmission frequency or range of frequencies for each zone 220 identified in the block 405. For example, the computer 110 could select a target such as a target vehicle 205 or pedestrian 215 in each zone 220, and could use a detected speed of the selected target along with a current speed of the host vehicle 105 in Equation 2 to determine the selected transmission frequency or range of frequencies for a zone 220. If more than one target is present in a zone, the target could be selected based on a prioritization rule or rules stored by the computer 110. For example, a pedestrian 215 could be given priority over a vehicle 205. In another example, a closest target, e.g., a closest vehicle 205 to the host vehicle 105 in a zone 220 could be the selected target in that zone 220. In yet another example, multiple targets in a zone 220, e.g., all targets within a specified distance of the host vehicle 105, e.g., 100 meters or 200 meters, etc., could be selected, and the speeds of these targets could be averaged and used in Equation 2.

Next, in a block 415, the computer 110 specifies a transmission pattern for sound to be emitted from one or more speakers 135 on the vehicle 105. A transmission pattern in the present context means a specification of a time or times for emitting sound at a specified frequency, and possibly also a direction or directions, e.g., directions whereby sound is emitted in or toward a selected zone 220, for emitting sound at the time or times. A direction could be specified with respect to a vehicle 105, e.g., as an angle with respect to a longitudinal axis 225. As illustrated in FIG. 2, a vehicle 105 can include multiple speakers 135, e.g., different speakers 135 could be oriented in various directions to emit sound toward zones 220 around the vehicle 105. Alternatively, a vehicle 105 could include a single speaker 135; a speaker (or speakers) 135 could be arranged to utilize any suitable mechanism for directionally transmitting sound, i.e. to transmit sound in a specified direction. In any event, whether the vehicle 105 includes one or more speakers 135, a speaker 135 could be configured to physically rotate and/or to directionally emit sound.

A transmission pattern could specify, for example, to emit sound at a first frequency or range of frequencies toward a first zone 220, and to emit sound at a second frequency or second range of frequencies toward a second zone 220. In one example, the transmission pattern could specify to emit sound toward the first and second zones 220 for a same amount, and/or same periods, of time. In another example, the transmission pattern can specify different amounts of time for emitting sound toward respective zones. For example, the computer 110 could identify a first zone 220 as having a higher priority than a second zone 220, e.g., referring back to FIG. 2, the zone 220b could have a highest priority over all other zones 220 because it is forward of and in the path of the vehicle 105. The zone 220c could have a next highest priority, because the vehicle 105 is moving closer to targets in that zone, and paths of the vehicle 105 and targets in the zone 220c could be at a higher risk of intersecting than paths of targets in other zones 220 (besides the forward zone 220b). Yet further, the zone 220a could have a third-highest priority because targets in that zone are in a same lane and/or moving on a same direction of travel as the host vehicle 105. Accordingly, a transmission pattern could specify emitting sound in a direction of a first zone 220a for a first amount of time at a frequency or frequencies specified for that zone 220a, e.g., four seconds, and then to emit sound for a second amount of time toward a second zone 220b, e.g., two seconds, at a second frequency or frequencies specified for the second zone 220b, etc.

A transmission pattern can also specify a frequency and/or a volume according to a location of a host vehicle 105, a type of target and/or a distance of a target from a host vehicle 105. For example, in certain circumstances, it may be desirable for an emergency vehicle 105 to emit what is sometimes referred to as a chirping sound, e.g., when a vehicle 205 is slowed or stopped in front of the emergency vehicle 105, when the emergency vehicle 105 is approaching are traveling through intersection, etc. Accordingly, the computer 110 could be programmed to specify a transmission pattern including a mission of short (e.g., one second or less) first of sound at a higher frequency than a frequency specified for a siren, and at a higher volume. The transmission pattern could specify the short bursts or chirps on one or more of the following conditions: the vehicle 105 is in or within a predetermined distance (e.g., 50 meters) of intersection, the vehicle 105 is within a predetermined distance of a specified type of target, e.g., a pedestrian 215, and/or the vehicle 105 is within a predetermined distance (e.g., 30 meters) of a target vehicle 205 that is stopped or slowed, G, moving at more than a predetermined amount (e.g., 50 percent) slower than the host vehicle 105. Further, a volume of future or short burst of sound could be specified according to a distance from a target, e.g., 120 decibels at a range of 100 meters, 100 decibels at a range of 50 meters, and 60 decibels at a range of 20 meters.

Following the block 415, the process 400 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on board first computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer readable medium (also referred to as a processor readable medium) that includes any non transitory (e.g., tangible) medium that participates in providing data (e.g., instructions) that may be read by a computer (e.g., by a processor of a computer). Such a medium may take many forms, including, but not limited to, non volatile media and volatile media. Non volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system for a host vehicle, comprising:
an object detection sensor;
a frequency generator coupled to a speaker; and
a computer that includes a processor and a memory, the memory storing instructions executable by the processor such that the processor is programmed to:
based on data from the object detection sensor, identify targets in respective zones around the host vehicle;
identify a multi-target zone from the plurality of zones that includes two or more of the targets;
select a target to represent the multi-target zone based on prioritizing the two or more targets within the multi-target zone;
detect respective speeds of the targets relative to the host vehicle based on data from the object detection sensor;
specify respective target frequencies for a sounds to be received at the targets vehicle;
determine respective sending frequencies for the sounds based on the target frequencies and the respective relative speeds of the targets; and
transmit the sounds according to a transmission pattern that specifies the sending frequencies and respective times for sending the sounds.

2. A system comprising a computer for a host vehicle that includes a processor and a memory, the memory storing instructions executable by the processor such that the processor is programmed to:
identify targets in respective zones around the host vehicle;
identify a multi-target zone from the plurality of zones that includes two or more of the targets;
select a target to represent the multi-target zone based on prioritizing the two or more targets within the multi-target zone;
detect respective speeds of the targets;
determine differences in a speed of the host vehicle and the speeds of the targets vehicle;

specify respective target frequencies for sounds to be received at the targets;

determine respective sending frequencies for the sounds based on the target frequencies and the difference in host vehicle speed and target speeds; and transmit the sounds according to a transmission pattern that specifies the sending frequencies and respective times for sending the sounds.

3. The system of claim 2, wherein the instructions further include instructions to actuate a first speaker to transmit a first one of the sounds at a first one of the sending frequencies and a second speaker to transmit a second one of the sounds at a second one of the sending frequencies.

4. The system of claim 2, wherein the instructions further include instructions to actuate a speaker at a first time to transmit a first one of the sounds at a first one of the sending frequencies and to actuate the speaker at a second time to transmit a second one of the sounds at a second one of the sending frequencies.

5. The system of claim 2, the instructions further including instructions to:

specify a range of frequencies for one of the sending frequencies; and transmit one of the sounds within the range of frequencies.

6. The system of claim 2, wherein the speed of the host vehicle is determined via a host vehicle speed sensor.

7. The system of claim 2, wherein the speed of at least one of the targets is detected via a host vehicle radar.

8. The system of claim 2, the instructions further comprising instructions to determine to transmit a second sound based on a distance of one of the targets.

9. The system of claim 8, the instructions further comprising instructions to transmit the second sound at a volume based on the distance of the of one of the targets.

10. The system of claim 2, the instructions further comprising instructions to identify the targets based on respective locations of the targets.

11. The system of claim 2, the instructions further comprising instructions to specify the sending frequencies for the sounds based at least in part on a locations of the targets.

12. The system of claim 2, the instructions further comprising instructions to specify the target frequencies based at least in part on respective locations of the targets relative to the host vehicle.

13. A method, comprising:

identifying targets in respective zones around the host vehicle;

identifying a multi-target zone from the plurality of zones that includes two or more of the targets;

selecting a target to represent the multi-target zone based on prioritizing the two or more targets within the multi-target zone;

detecting respective speeds of the targets;

determining differences in a speed of the host vehicle and the speeds of the targets;

specifying respective target frequencies for sounds to be received at the targets;

determining respective sending frequencies for the sounds based on the target frequencies and the difference in host vehicle speed and target speeds; and transmitting the sounds according to a transmission pattern that specifies the sending frequencies and respective times for sending the sounds.

14. The method of claim 13, further comprising:

specifying a range of frequencies for one of the sending frequencies; and transmitting one of the sounds within the range of frequencies.

15. The method of claim 13, wherein the speed of the host vehicle is determined via a host vehicle speed sensor.

16. The method of claim 13, wherein the speed of at least one of the targets is detected via a host vehicle radar.

17. The method of claim 13, further comprising identifying the targets based on respective locations of the targets.

18. The method of claim 13, further comprising specifying the target frequencies based at least in part on respective locations of the targets relative to the host vehicle.

* * * * *